United States Patent
Chen et al.

(10) Patent No.: US 11,440,179 B2
(45) Date of Patent: Sep. 13, 2022

(54) SYSTEM AND METHOD FOR ROBOT TEACHING BASED ON RGB-D IMAGES AND TEACH PENDANT

(71) Applicant: QINGDAO UNIVERSITY OF TECHNOLOGY, Shandong (CN)

(72) Inventors: Chengjun Chen, Shandong (CN); Yong Pan, Shandong (CN); Dongnian Li, Shandong (CN); Jun Hong, Shandong (CN)

(73) Assignee: QINGDAO UNIVERSITY OF TECHNOLOGY, Qingdao (CN)

( * ) Notice: Subject to any disclaimer, the term of this patent is extended or adjusted under 35 U.S.C. 154(b) by 357 days.

(21) Appl. No.: 16/804,888

(22) Filed: Feb. 28, 2020

(65) Prior Publication Data

US 2021/0023694 A1  Jan. 28, 2021

(30) Foreign Application Priority Data

Jul. 23, 2019 (CN) .......................... 201910665326.9

(51) Int. Cl.
  *B25J 9/00*  (2006.01)
  *B25J 9/16*  (2006.01)
  *B25J 19/02*  (2006.01)
  *G06T 19/00*  (2011.01)

(52) U.S. Cl.
  CPC .......... *B25J 9/0081* (2013.01); *B25J 9/1697* (2013.01); *B25J 19/023* (2013.01); *G06T 19/006* (2013.01)

(58) Field of Classification Search
  CPC ...... B25J 9/0081; B25J 9/1697; B25J 19/023; G06T 19/006
  See application file for complete search history.

(56) References Cited

U.S. PATENT DOCUMENTS

| | | | |
|---|---|---|---|
| 2015/0224648 A1* | 8/2015 | Lee | G06T 7/73 901/47 |
| 2019/0266789 A1* | 8/2019 | Rezaiifar | G06T 7/194 |
| 2019/0302460 A1* | 10/2019 | Kaul | A61B 5/6803 |
| 2020/0398420 A1* | 12/2020 | Nagano | B25J 13/08 |

* cited by examiner

*Primary Examiner* — Kira Nguyen (57) ABSTRACT

A system for robot teaching based on RGB-D images and a teach pendant, including an RGB-D camera, a host computer, a posture teach pendant, and an AR teaching system which includes an AR registration card, an AR module, a virtual robot model, a path planning unit and a posture teaching unit. The RGB-D camera collects RGB images and depth images of a physical working environment in real time. In the path planning unit, path points of a robot end effector are selected, and a 3D coordinates of the path points in the basic coordinate system of the virtual robot model are calculated; the posture teaching unit records the received posture data as the postures of a path point where the virtual robot model is located, so that the virtual robot model is driven to move according to the postures and positions of the path points, thereby completing the robot teaching.

10 Claims, 4 Drawing Sheets

SYSTEM AND METHOD FOR ROBOT TEACHING BASED ON RGB-D IMAGES AND TEACH PENDANT

CROSS-REFERENCE TO RELATED APPLICATIONS

This application claims the benefit of priority from Chinese Patent Application No. 201910665326.9, filed on Jul. 23, 2019. The content of the aforementioned invention, including any intervening amendments thereto, is incorporated herein by reference in its entirety.

TECHNICAL FIELD

The present invention relates to intelligent manufacturing, more particularly to a system and a method for robot teaching based on RGB-D images and a teach pendant.

BACKGROUND OF THE INVENTION

Currently, typical applications of industrial robots include welding, grinding, assembling and spraying, and robot programming is the key to making the robots complete complex tasks. Programming methods of the industrial robot are mainly categorized into online teaching programming, offline teaching programming and autonomous programming. The online teaching programming is carried out by manually dragging a robot end effector or operating a teach pendant by teaching programmers, to drive the robot end to a target path point, and the path point is stored as the robot programming path. However, this method can only complete the programming for points and simple paths. In addition, the programming accuracy is hard to be ensured, and such method has a complicated programming process, low efficiency, and potential safety problem. The offline teaching programming is realized by establishing a physical robot model and a 3D model of an actual working environment in the virtual environment, driving a virtual robot through computer operations to simulate a working process of the physical robot and generate a path plan for the physical robot. However, the offline teaching programming requires professional technicians to build a virtual model of the actual working environment, and it has problems of large modeling workload, difficult operation, low programming efficiency and being inapplicable for dynamic changing working scenarios. Also, in the offline teaching programming, the programmers should have both professional skills and higher capabilities of computer modeling and operating. A process of the autonomous programming is described as follows: the robot detects the physical working environment using visual sensors to obtain real-time geometric information of the scene, so that the path of the robot is autonomously planned online. In this programming method, the robot can independently complete certain tasks without the external control. However, the autonomous programming has defects of poor environment adaptability, poor anti-interference ability, and high visual servoing cost.

Due to the development of the personalized product customization and mixed model production, robot programming has become a key factor affecting the production efficiency. Chinese Patent Publication No. CN107309882 A discloses a system and a method for robot teaching programming, in which positions and postures of hand-held teach pendants of front-line workers are tracked by a posture and position tracking system and a teaching system, while the corresponding process parameters are collected. Then, the teaching data is sent to a computer system for an AR (Augmented Reality) teaching simulation, and finally processed and compiled to generate a robot program. The technical solution adopts a harmonious human-computer interaction method to enable the front-line workers to generate robot programs in a virtual-real fusion environment, which replaces existing robot teach pendants, thereby revolutionizing the online and offline teaching programming methods. However, this technical solution requires a high-precision and large-scale posture tracking system, which has a high cost and great integration difficulty.

SUMMARY OF THE INVENTION

In order to overcome the above-mentioned technical problems, the present invention provides a system for robot teaching based on RGB-D (RED GREEN BLUE AND DEPTH) images and a teach pendant, in which complicated position and posture tracking systems are eliminated; physical robots are not involved in the robot teaching; and the teaching programming is completed by the AR simulation.

In a first aspect, the present invention provides a system for robot teaching based on RGB-D images and a teach pendant, comprising a RGB-D camera, a host computer, a posture teach pendant and an AR teaching system; wherein, the RGB-D camera and the posture teach pendant are communicated with the host computer; the RGB-D camera is set in a physical working environment, and the AR teaching system comprises an AR registration card located in the physical working environment, an AR module running in the host computer, a virtual robot model comprising a robot end effector, a path planning unit and a posture teaching unit; RGB images and depth images of the physical working environment are collected by the RGB-D camera in real time and are sent to the host computer; the AR module sets a position of a virtual camera in a virtual scene, and overlays the virtual robot model on the RGB images to complete AR registration; the path planning unit displays the RGB images and depth images, and a teaching programmer interactively selects path points of the robot end effector on the RGB images, thereby calculating a 3D coordinate of each of the path points of the robot end effector in a basic coordinate system of the virtual robot model based on the transformation between the depth images and the RGB images; the posture teach pendant is operated by the teaching programmer to generate posture data; the posture teaching unit receives the posture data of the posture teach pendant in real time when the host computer sequentially reads the 3D coordinates of the path points of the robot end effector in the basic coordinate system of the virtual robot model, and then the virtual robot model moves based on the 3D coordinates; during the movement, the received posture data is recorded as the posture data corresponding to a 3D coordinate of a path point where the virtual robot model is located, so that the virtual robot model moves in accordance with teaching postures and positions to complete the robot teaching.

Preferably, the AR teaching system further comprises a virtual-real collision detection module running in the host computer; when the virtual robot model moves in accordance with the teaching postures and positions, the virtual-real collision detection module detects whether the virtual robot model interferes with the physical working environment; if yes, a prompt is issued, so that the teaching programmer controls the posture teach pendant to adjust the teaching postures and positions in time until the interference disappears;

after the robot teaching is completed, the path points are edited to form a path trajectory; based on the edited path trajectory, the host computer generates a program code based on an instruction format of a programming system of a physical robot, and transmits the program code to a controller of the physical robot, so as to control the physical robot to work in the physical working environment.

Preferably, the posture teach pendant comprises a signal processing unit, an inertial measurement unit connected to the signal processing unit, an input switch button unit, a wireless communication unit, and an interface display unit; an inertial sensor built in the inertial measurement unit is used to measure the posture data of the posture teach pendant in a Cartesian coordinate system; the teaching programmer sets parameter information of the robot end effector through the input switch button unit, and the input switch button unit transmits the parameter information set by a button to the signal processing unit; the parameter information and posture data are processed by the signal processing unit and sent by the wireless communication unit to the host computer, and the host computer drives the virtual robot model after receiving the processed parameter information and posture data; and the interface display unit displays working states and working data of the posture teach pendant in real time.

Preferably, the posture teaching unit receives the posture data and parameter information of the posture teach pendant in real time when the host computer sequentially reads the 3D coordinates of the path points in the basic coordinate system of the virtual robot model, and then the virtual robot model moves based on the 3D coordinates; during the movement, the received posture data and the parameter information are recorded as the posture data and the parameter information corresponding to 3D coordinates of the path point where the virtual robot model is located, so that the virtual robot model moves in accordance with the teaching postures and positions to complete the robot teaching.

Preferably, the virtual robot model is established in the host computer; specifically, in the host computer, 3D models of the physical robot and the robot end effector which are the same as the physical robot are drawn to scale; and a forward kinematics model and an inverse kinematics model are established based on structures and parameters of the physical robot and the robot end effector, thereby establishing the virtual robot model.

Preferably, after creating the virtual robot model and completing the AR registration, the host computer further performs the following steps:

1. establishing coordinate systems and calibrating mapping relationships;

(1) setting a coordinate system of the AR registration card as a world coordinate system of the virtual scene and a physical scene, and setting the coordinate system of the AR registration card as the basic coordinate system of the virtual robot model; making a basic coordinate system of the physical robot coincide with the basic coordinate system of the virtual robot model;

(2) in the path planning unit: establishing an RGB image pixel coordinate system, a depth image pixel coordinate system, an RGB camera coordinate system, and a depth camera coordinate system, and establishing mapping relationships among the RGB image pixel coordinate system, the depth image pixel coordinate system, the RGB camera coordinate system, and the depth camera coordinate systems; and (3) in the posture teaching unit: obtaining a homogeneous transformation matrix $M_V^N$ between the basic coordinate system of the virtual robot model and the Cartesian coordinate system through calibrating or setting; where the basic coordinate system of the posture teach pendant is the Cartesian coordinate system; $Q_V = M_V^N * Q$, where Q is the homogeneous coordinate matrix of the posture teach pendant in the Cartesian coordinate system, and $Q_V$ is the homogeneous coordinate matrix of the posture teach pendant in the basic coordinate system of the virtual robot model, converting the posture data of the posture teach pendant in the Cartesian coordinate system to the basic coordinate system of the virtual robot model.

Preferably, the step of calculating the 3D coordinate of each of the path points of the robot end effector in the basic coordinate system of the virtual robot model based on the transformation between the depth images and the RGB images comprises:

after the teaching programmer selects the path points on the RGB images, calibrating a RGB image pixel coordinate (u, v) of each of the path points; calculating a transformation matrix H of the RGB image pixel coordinate system relative to the depth image pixel coordinate system through the calibration or factory parameters of the RGB-D camera, and calculating a depth image pixel coordinate ($u_d$, $v_d$) of each of the path points corresponding to the RGB image pixel coordinate (u, v) based on the transformation matrix H, and reading out a corresponding depth value z; calibrating an internal parameter matrix M of the depth camera, and calculating a position (x, y, z) of each of the path points of the depth image pixel coordinate system in the depth camera coordinate system through the internal parameter matrix M; calibrating a transformation matrix $M_D^R$ of the depth camera coordinate system to the RGB camera coordinate system, and recognizing the AR registration card in the RGB images through an AR registration algorithm, thereby calculating an RGB camera posture matrix $M_R^A$ in the coordinate system of the AR registration card; converting the RGB image pixel coordinate (u, v) into the depth image pixel coordinate ($u_d$, $v_d$) through an equation $$\begin{bmatrix} u_d \\ v_d \\ 1 \end{bmatrix} = H * \begin{bmatrix} u \\ v \\ 1 \end{bmatrix},$$

and after reading out the corresponding depth value z, sequentially transforming the virtual robot model through the depth camera coordinate system, the RGB camera coordinate system, and the base coordinate system of the virtual robot model, so as to obtain a 3D coordinate (X, Y, Z) of each of the path points in the basic coordinate system of the virtual robot model; wherein the transformation is:

$$\begin{bmatrix} x \\ y \\ z \\ 1 \end{bmatrix} = M^{-1} * z \begin{bmatrix} u_d \\ v_d \\ 1 \end{bmatrix}, \begin{bmatrix} X \\ Y \\ Z \\ 1 \end{bmatrix} = M_R^A * M_D^R * \begin{bmatrix} x \\ y \\ z \\ 1 \end{bmatrix}.$$

The invention also provides a method for robot teaching based on RGB-D images and a teach pendant.

In a second aspect, the present invention adopts the following technical solutions.

The present invention provides a method for robot teaching based on RGB-D images and a teach pendant, comprising:

1. teaching path trajectory: collecting the RGB images and depth images of the physical working environment to the host computer in real time through the RGB-D camera located in the physical working environment, and displaying the RGB images and depth images in the host computer; reading out the path points of the robot end effector, and calculating the 3D coordinate of each of the path points of the robot end effector in the basic coordinate system of the virtual robot model based on the transformation between the depth images and the RGB images by the teaching programmer;

2. teaching postures: connecting the posture teach pendant with the host computer in communication; operating the posture teach pendant by the teaching programmer to generate posture data, and sending the posture data to the host computer in real time; receiving, by the posture teaching unit, posture data of the posture teach pendant in real time when the host computer sequentially reads 3D coordinates of the path points in the basic coordinate system of the virtual robot model, so that the virtual robot model moves based on the 3D coordinates; during the movement, recording the received posture data as the posture data corresponding to the 3D coordinate of the path point where the virtual robot model is located; calculating rotation angles of joints of the virtual robot model using the inverse kinematics model of the physical robot based on positions and postures of the path points; driving movements of the joints of the virtual robot model in the AR environment, and simulating the positions and postures of the physical robot during operating, so as to complete the robot teaching; and preferably, in the step 2, when the virtual robot model moves based on the teaching postures, a virtual-real collision detection module is used to to detect whether the virtual robot model interferes with the physical working environment; if yes, a prompt is issued, so that the teaching programmer controls the posture teach pendant to adjust the teaching posture in time until the interference disappears; and 3. processing and AR simulating after teaching: after the robot teaching is completed, editing, by the host computer, the recorded teaching path trajectory and teaching postures, and calculating the rotation angles of the joints of the physical robot using the inverse kinematics model of the physical robot based on the edited data by the host computer, thereby driving the virtual robot model to move and simulating the working process of the physical robot in the AR registration environment.

Preferably, in the step 1, the step of calculating the 3D coordinate of each of the path points of the robot end effector in the basic coordinate system of the virtual robot model based on the transformation between the depth images and the RGB images comprises:

after the teaching programmer selects the path points on the RGB images, calibrating the RGB image pixel coordinate (u,v) of each of the path points;

calculating a transformation matrix H of the RGB image pixel coordinate system relative to the depth image pixel coordinate system through calibration or factory parameters of the RGB-D camera, and calculating the depth image pixel coordinate $(u_d, v_d)$ of each of the path points corresponding to the RGB image pixel coordinate (u, v), and reading out the corresponding depth value z; calibrating an internal parameter matrix M of the depth camera, and calculating the position (x, y, z) of the path point of the depth image pixel coordinate system in the depth camera coordinate system through the internal parameter matrix M; calibrating a transformation matrix $M_D^R$ of the depth camera coordinate system to the RGB camera coordinate system, and recognizing the AR registration card in the RGB images through an AR registration algorithm, thereby calculating an RGB camera posture matrix $M_R^A$ in the coordinate system of the AR registration card; converting the RGB image pixel coordinate (u, v) into the depth image pixel coordinate $(u_d, v_d)$ through an equation $$\begin{bmatrix} u_d \\ v_d \\ 1 \end{bmatrix} = H * \begin{bmatrix} u \\ v \\ 1 \end{bmatrix},$$

and after reading out the corresponding depth value z, sequentially transforming the virtual robot model through the depth camera coordinate system, the RGB camera coordinate system, and the base coordinate system of the virtual robot model, so as to obtain a 3D coordinate (X, Y, Z) of each of the path points in the basic coordinate system of the virtual robot model; wherein the transformation is:

$$\begin{bmatrix} x \\ y \\ z \\ 1 \end{bmatrix} = M^{-1} * z \begin{bmatrix} u_d \\ v_d \\ 1 \end{bmatrix}, \begin{bmatrix} X \\ Y \\ Z \\ 1 \end{bmatrix} = M_R^A * M_D^R * \begin{bmatrix} x \\ y \\ z \\ 1 \end{bmatrix}.$$

The invention has the following beneficial effects.

The invention provides a system and a method of robot teaching based on RGB-D images and a posture teach pendant, in which a RGB-D camera and a teach pendant are used to teach programming without a complicated tracking system for position and posture; an AR simulation is used to complete the teaching programming, so that the physical robots do not participate in teaching; an virtual-real collision detection module are configured to find the deficiencies in teaching programming, where the teaching posture of the virtual robot can be adjusted at any time based on the motion status, thereby avoiding dangers such as physical robot collision; the invention also has the advantage of easy programming and high efficiency; besides, the invention can combine the valuable experience of front-line workers, thereby greatly improving the quality of robot teaching programming.

In the drawing, 10, RGB-D camera; 20, host computer; 30, posture teach pendant; 31, signal processing unit; 32, inertial measurement unit; 33, input switch button unit; 34, wireless communication unit; 35, interface display unit; 40, AR teaching system; 41, AR registration card; 42, AR module; 43, virtual robot model; 44, path planning unit; 45, posture teaching unit; 46, virtual-real collision detection unit; 50, physical robot; 60, physical robot controller; 70, teaching programmer.

DETAILED DESCRIPTION OF EMBODIMENTS

The invention will be described in detail below with reference to the drawings and embodiments.

EXAMPLE 1

Figure 1:
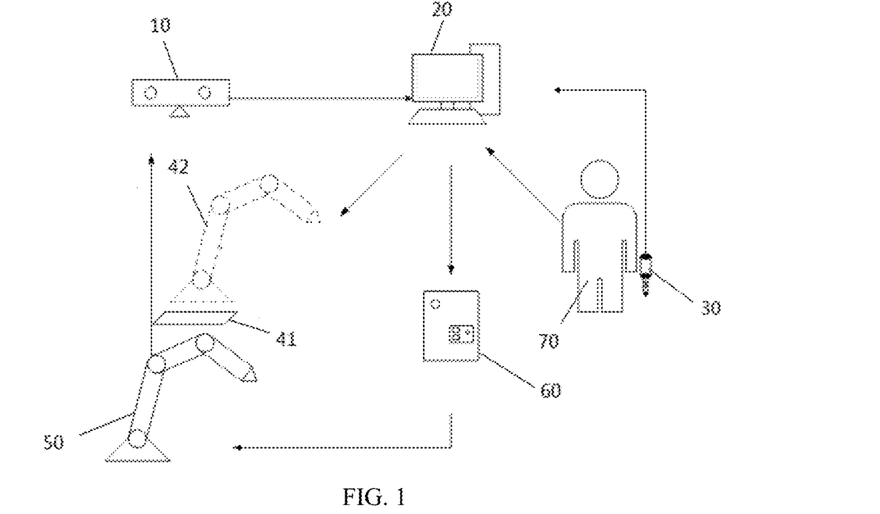
FIG. 1 is a schematic structural diagram of a system of robot teaching based on RGB-D images and a posture teach pendant of the present invention.
Figure 2:
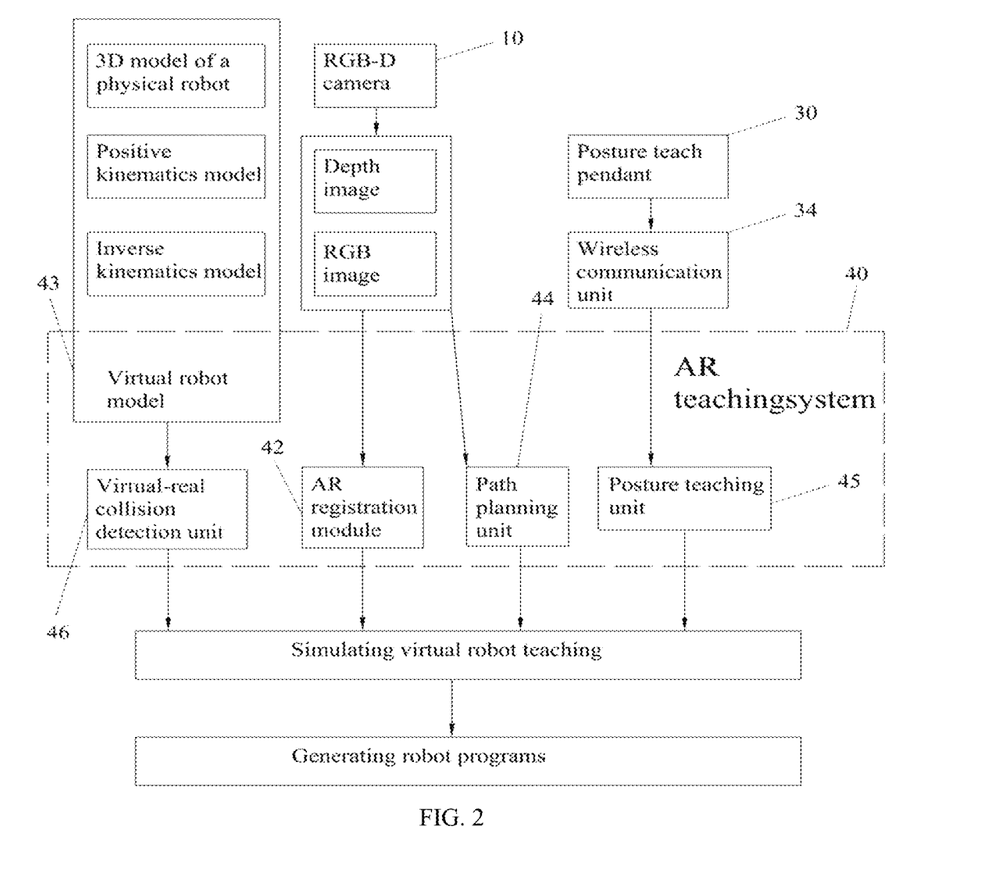
FIG. 2 is a block diagram of a teaching process of the system of the present invention.
Figure 5:
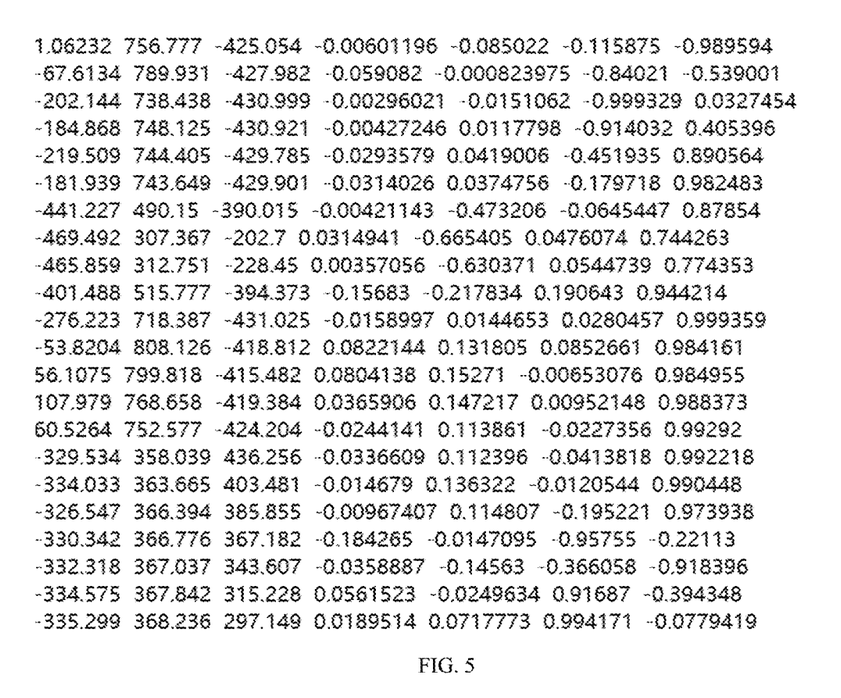
FIG. 5 is a schematic diagram of 3D coordinates and posture data of associated recording path points in the system of the present invention.
Figure 6:
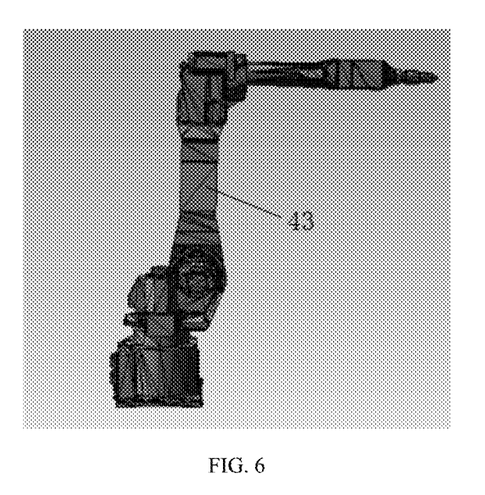
FIG. 6 schematically shows how a virtual robot model in a host computer in the system of the present invention is established.
Figure 7:
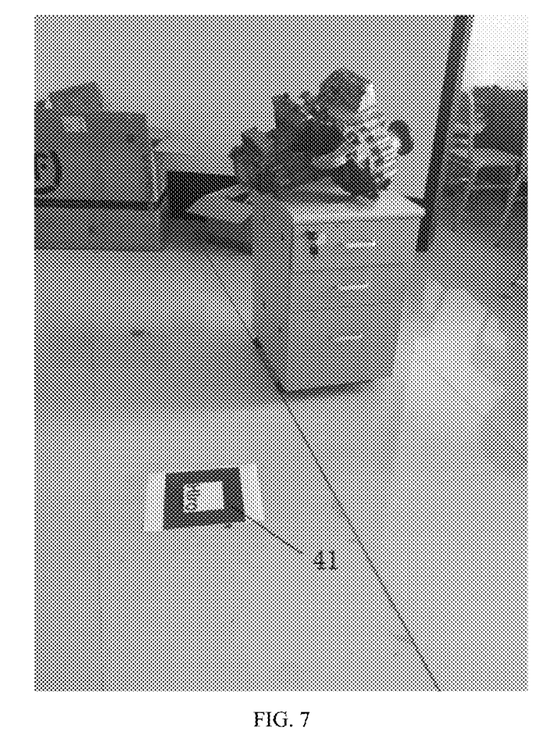
FIG. 7 is an image of a physical working environment of the system of the present invention.
Figure 8:
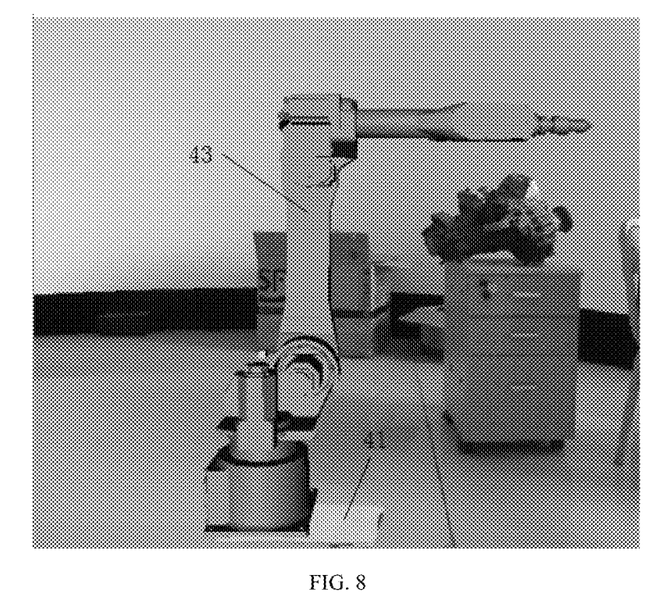
FIG. 8 is an image of a virtual robot model of the system of the present invention, in which the virtual robot is placed on an AR registration card.

Referring to FIGS. 1 and 2, illustrated is a system for robot teaching based on RGB-D images and a teaching pendant, including a RGB-D camera 10, a host computer 20, a posture teach pendant 30, and an AR teaching system 40, where the RGB-D camera 10 and the posture teach pendant 30 are communicated with the host computer 20; the RGB-D camera 10 includes an RGB camera and a depth camera; the AR teaching system 40 includes an AR registration card 41 working in a physical working environment, an AR module 42 running on the host computer 20, a virtual robot model 43 including a robot end effector (as shown in FIG. 6), a path planning unit 44 and a posture teaching unit 45; RGB images and depth images of the physical working environment are collected by the RGB-D camera 10 in real time and are sent to the host computer (as shown in FIG. 7); the AR module 42 calculates a transformation matrix $M_A^R$ of the AR registration card 41 relative to the RGB camera based on the RGB images, where the transformation matrix $M_A^R$ is an inverse matrix of RGB camera posture matrix $M_R^A$ in an AR registration card coordinate system; the position of the virtual camera is set in the virtual world through the transformation matrix $M_A^R$, and the virtual robot model 43 is overlaid on a position of the AR registration card on the RGB images to complete the AR registration (as shown in FIG. 8); the path planning unit 44 displays the RGB images and the depth images, so that the teach programmer 70 selects path points of the robot end effector on the RGB images by using an interactive mode, where the interactive mode can be implemented by using a mouse or tapping on a touch screen; based on the transformation between the depth images and the RGB images, the 3D coordinate of each path point of the robot end effector on the RGB image in the basic coordinate system of the virtual robot model is calculated; the posture teach pendant 30 is operated and taught by the teaching programmer 70 to generates posture data; the posture teaching unit 45 receives the posture data of the posture teach pendant in real time when the host computer 20 sequentially reads the 3D coordinates of the path points of the robot end effector in the basic coordinate system of the virtual robot model, so that the virtual robot model 43 moves based on 3D coordinates; during the movement, the received posture data and the parameter information are recorded as the posture data and the parameter information corresponding to 3D coordinates of the path point where the virtual robot model is located (as shown in FIG. 5), so that the virtual robot model in the physical working environment (i.e. a physical working environment acquired by the RGB-D camera 10 and displayed by the RGB images) moves in accordance with the teaching postures and positions to complete the robot teaching. After the robot teaching is completed, the path points are edited to form a path trajectory, and the host computer 20 generates a program code based on the edited path trajectory and the instruction format of a programming system of a physical robot, so as to control the robot to achieve mass production.

the specific steps of calculating 3D coordinate of each path point of the robot end effector in a basic coordinate system of the virtual robot model based on a transformation between the depth images and the RGB images are as follows: after the teaching programmer 70 selects the path points on the RGB images, the RGB image pixel coordinate (u, v) of each path point is calibrated; a transformation matrix H of the RGB image pixel coordinate system relative to the depth image pixel coordinate system is calculated through calibration calculation or factory parameters of the RGB-D camera, and the depth image pixel coordinate ($u_d$, $v_d$) of each point corresponding to the RGB image pixel coordinate (u, v) is calculated, and the corresponding depth value z is read; an internal parameter matrix M of the depth camera is calibrated, and the position (x, y, z) of the path point (the coordinate is ($u_d$, $v_d$), and the depth value is z) of the depth image pixel coordinate system in the depth camera coordinate system are calculated through the parameter matrix M; a transformation matrix $M_D^R$ of the depth camera coordinate system to the RGB camera coordinate system is calibrated (the calibration method can use Zhang Zhengyou's calibration method, in which a checkerboard calibration board is used, and the relative position of the calibration board and the camera is constantly changed, while the RGB-D camera 10 is used to capture the checkerboard RGB image and infrared image (because the depth image is not visible on the checkerboard grid, the infrared image is used; because both data sources are obtained by the depth camera, the external parameter calibrated by the infrared image is the external parameter of the depth camera), so that the external parameter matrix of the RGB camera and the depth camera obtained by establishing a world coordinate system based on the checkerboard is calculated, and the transformation matrix $M_D^R$ of depth camera and RGB camera can be obtained through two external parameter matrices), and the AR registration card 41 in RGB image is recognized through an AR registration algorithm, so that the RGB camera posture matrix $M_R^A$ in the AR registration card coordinate system is calculated; the RGB image pixel coordinate (u, v) is converted into the depth image pixel coordinate ($u_d$, $v_d$) through an equation $$\begin{bmatrix} u_d \\ v_d \\ 1 \end{bmatrix} = H * \begin{bmatrix} u \\ v \\ 1 \end{bmatrix},$$

and after the corresponding depth value z is read, the virtual robot model is sequentially transformed through the depth camera coordinate system, the RGB camera coordinate system, and the virtual robot model basic coordinate system, so that a 3D coordinate (X, Y, Z) of each path point in the basic coordinate system of the virtual robot model is obtained; the transformation is:

$$\begin{bmatrix} x \\ y \\ z \\ 1 \end{bmatrix} = M^{-1} * z \begin{bmatrix} u_d \\ v_d \\ 1 \end{bmatrix}, \begin{bmatrix} X \\ Y \\ Z \\ 1 \end{bmatrix} = M_R^A * M_D^R * \begin{bmatrix} x \\ y \\ z \\ 1 \end{bmatrix}.$$

Figure 3:
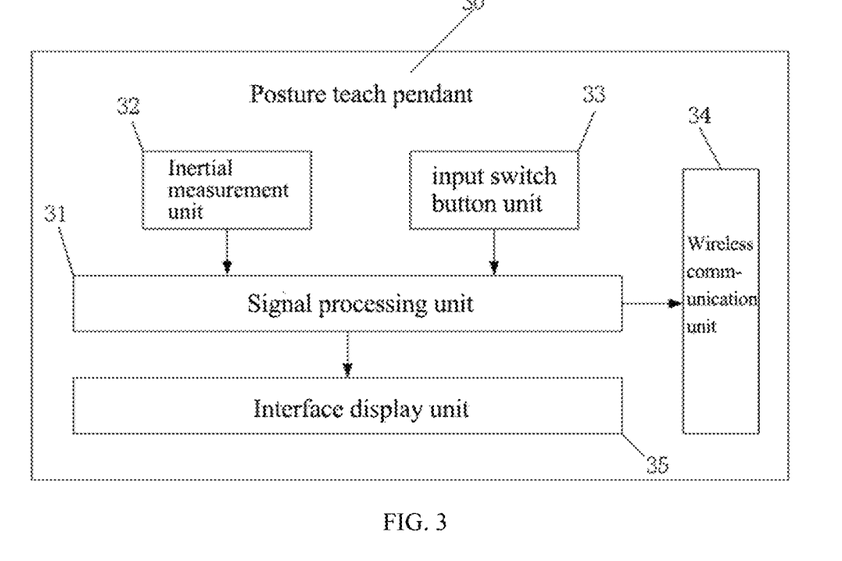
FIG. 3 is a schematic diagram of a posture teach pendant of the system of the present invention.

As shown in FIG. 3, the posture teach pendant 30 includes a signal processing unit 31 and an inertial measurement unit 32 connected to the signal processing unit 31, an input switch button unit 33, a wireless communication unit 34, and an interface display unit 35. The inertial sensor built in the inertial measurement unit 32 measures the posture data of the posture teach pendant 30 in the Cartesian coordinate system; the teaching programmer 70 sets movement speed, working mode and process parameters of the robot end effector through the input switch button unit 33 of the posture teach pendant 30. For example, in welding programming, welding process parameters include: welding voltage, welding current, welding gun switch signal, wire feeding speed, protective gas switch signal, etc. The working mode refers to different distance between the robot end effector and the workpiece to be operated while setting the industrial robot to perform different operations (such as welding, grinding, painting, etc.). for example, the robot end effector needs to contact the surface of the workpiece when welding, while there must be a certain distance from the surface of the workpiece when spraying. The input switch button unit 33 transmits parameter information set by the button (the parameter information includes the movement speed, process parameters of the robot end effector, working mode, etc.) to the signal processing unit 31; after the parameter information and the posture data is processed by the signal processing unit 31, the wireless communication unit 34 sends the signal being processed to the host computer 20; after receiving the above information, the host computer 20 drives the virtual robot model 43. The interface display unit 35 displays the working state and the working data of the posture teach pendant 30 in real time, such as a communication connection state and a switch state. The posture teaching unit 45 receives the posture data and the parameter information of the posture teach pendant 30 in real time when the host computer 20 sequentially reads the 3D coordinates of the path points in the basic coordinate system of the virtual robot model. The teaching unit 45 records the received the parameter information and the posture data as the posture and parameter of the path point at which the current motion is located, and drives the virtual robot model 43 to move based on the position, posture, and parameters (such as motion speed) of the path point, so that the virtual robot model 43 moves in the physical working environment in accordance with teaching postures and positions to complete the robot teaching. After the robot teaching is completed, the path points are edited to form a path trajectory, and the host computer 20 generates a program code based on the edited path trajectory and the instruction format of the programming system of the physical robot to control the robot to achieve mass production.

More preferably, the AR teaching system 40 further includes a virtual-real collision detection module running in the host computer 20; when the virtual robot model 43 moves in accordance with the teaching postures and positions, the virtual-real collision detection module detects whether the virtual robot model 43 interferes with the physical working environment (i.e., the physical working environment displayed by the RGB image acquired by the RGB-D camera 10); if yes, a prompt is issued, so that the teaching programmer 70 controls the posture teach pendant 30 to adjust the teaching postures and positions in time until the interference disappears. The virtual-real collision detection module may adopt the detection method disclosed in Chinese Patent Application Publication No. CN108898676A which discloses "A Method and System for Collision and Occlusion Detection Between Virtual and Real Objects".

Figure 4:
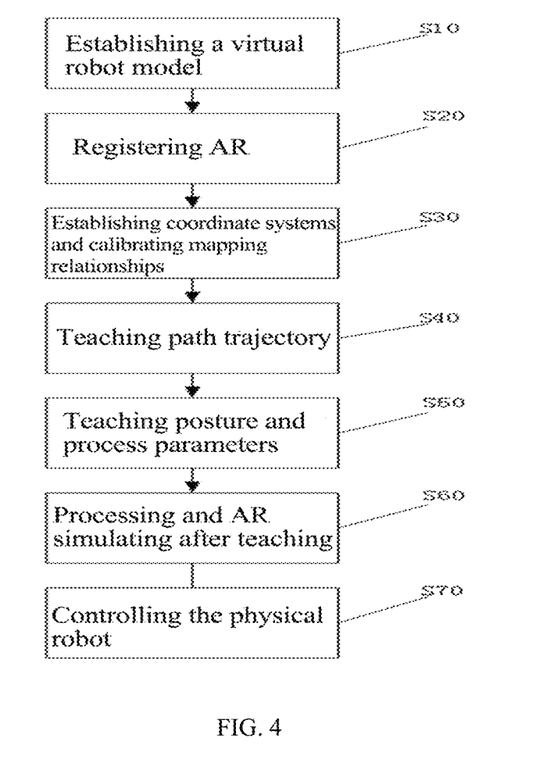
FIG. 4 is a flowchart of a method of robot teaching based on RGB-D images and a posture teach pendant of the present invention.

Referring to FIG. 4, the operation steps of the teaching system are as follows.

System Initialization

S10: Establishing a virtual robot model 43 in the host computer 20: as shown in FIG. 6, the 3D models of the physical robot and the robot end effector which are the same as the physical robot 50 are drawn to scale in the host computer 20; and a forward kinematics model and an inverse kinematics model are established based on structures and parameters of the physical robot and the robot end effector, thereby establishing a virtual robot model 43.

S20: Registering AR: the AR registration module in the AR teaching system 40 reads the position of the AR registration card 41 in the RGB images, and calculates the transformation matrix $M_A^R$ of the RGB camera relative to the AR registration card 41 through the AR registration algorithm; the host computer 20 use the transformation matrix $M_A^R$ to set the position of the virtual camera in the virtual world, and accurately place the virtual robot model 43 on the position of the AR registration card 41 in the RGB images, so as to achieve the integration of the virtual environment and the physical working environment, as shown in FIG. 8. In this embodiment, artookit can be used for AR registration, in which the transformation matrix from the AR registration card coordinate system to the camera coordinate system can be calculated; after the transformation matrix is converted into a homogeneous coordinate matrix, the transformation matrix $M_A^R$ of RGB camera relative to AR registration card 41 is obtained. The transformation matrix of the card 41 is used to set the position of the virtual camera for AR registration.

S30: Establishing coordinate systems and calibrating mapping relationships:

(1) a coordinate system of the AR registration card is set as a world coordinate system of the virtual scene and a physical scene, and the system of the AR registration card coordinate is set as the virtual robot model basic coordinate system; in order to obtain the transformation matrix of the physical robot from basic coordinate system to the world coordinate system (i.e., the basic coordinate system of the virtual robot model), the coordinates of the corresponding common point set in the basic coordinate system of the physical robot and the world coordinate system is obtained (the points in the common point set are the coordinates in the physical robot base coordinate system corresponding with the world coordinate system. For example, four points ABCD in the world coordinate system are selected and the corresponding coordinates in the world coordinate system are recorded, and then the end effector of the physical robot are placed on the four points, so that the coordinates of the four points in the basic coordinates of the physical robot are obtained); an iterative method based on an orthogonal matrix is used to solve the transformation matrix $M_r^w$ of the physical robot coordinate system to the world coordinate system, and the transformation matrix $M_r^w$ is used to transform the basic coordinate system of the physical robot to the world coordinate system, thereby realizing the coincidence of the basic coordinate system of the physical robot and the basic coordinate system of the virtual robot model.

S320: In the path planning unit: an RGB image pixel coordinate system, a depth image pixel coordinate system, an RGB camera coordinate system, and a depth camera coordinate system are established, and mapping relationships among the RGB image pixel coordinate system, the depth image pixel coordinate system, the RGB camera coordinate system, and the depth camera coordinate systems are established. The selected waypoint is taken as an example to illustrate the process of establishing the mapping relationship: after the teaching programmer 70 selects the path point on the RGB image, the RGB image pixel coordinate (u,v) of each path point is calibrated; a transformation matrix H of the RGB image pixel coordinate system relative to the depth image pixel coordinate system is calculated through calibration calculation or factory parameters of the RGB-D camera 10; the depth image pixel coordinates ($u_d$, $v_d$) of each point corresponding to the RGB image pixel coordinate (u,v) is calculated, and the corresponding depth value z is read; an internal parameter matrix M of the depth camera is calibrated, and the position (x, y, z) of the path point (the coordinate is ($u_d$, $v_d$), the depth value is z) of the depth image pixel coordinate system in the depth camera coordinate system is calculated through the parameter matrix M; the external parameter matrices of the RGB camera and the depth camera are calibrated, and a transformation matrix $M_D^R$ of the depth camera and the RGB camera can be obtained through the two external parameter matrices; the AR registration card 41 in RGB images is recognized through an AR registration algorithm, thereby calculating the RGB camera posture matrix $M_R^A$ in the AR registration card coordinate system; the RGB image pixel coordinate (u, v) is converted into the depth image pixel coordinate ($u_d$, $v_d$) through an equation $$\begin{bmatrix} u_d \\ v_d \\ 1 \end{bmatrix} = H * \begin{bmatrix} u \\ v \\ 1 \end{bmatrix};$$

after the corresponding depth value z is read, the virtual robot model is sequentially transformed through the depth camera coordinate system, the RGB camera coordinate system, and the virtual robot model base coordinate system, so that a 3D coordinate (X, Y, Z) of the path point in the basic coordinate system of the virtual robot model is obtain; the transformation is:

$$\begin{bmatrix} x \\ y \\ z \\ 1 \end{bmatrix} = M^{-1} * z \begin{bmatrix} u_d \\ v_d \\ 1 \end{bmatrix}, \begin{bmatrix} X \\ Y \\ Z \\ 1 \end{bmatrix} = M_R^A * M_D^R * \begin{bmatrix} x \\ y \\ z \\ 1 \end{bmatrix}.$$

S330: In the posture teaching unit 45: a homogeneous transformation matrix $M_V^N$ between the basic coordinate system of the virtual robot model and the Cartesian coordinate system is obtained through calibrating or setting; where the basic coordinate system of the posture teach pendant is the Cartesian coordinate system; $Q_V = M_V^N * Q$, where Q is the homogeneous coordinate matrix of the posture teach pendant is set in the Cartesian coordinate system as, and $Q_V$ is the homogeneous coordinate matrix of the posture teach pendant in the basic coordinate system of the virtual robot model, then; thereby, the posture data of the posture teach pendant 30 in the Cartesian coordinate system are converted to the basic coordinate system of the virtual robot model.

The interactive teaching programming steps are as follows.

S40: Teaching path trajectory: the path planning unit 44 in the host computer 20 displays the RGB images and depth images of the physical working environment collected by the RGB-D camera 10 in real time; the teaching programmer 70 uses a mouse or other interactive device to select a series of working path points on the path of the planning robot end effector, and the path point is coordinate transformed to obtain the 3D coordinates (X, Y, Z) of the robot end effector in the base coordinate system of the virtual robot model.

S50: Teaching posture and process parameters: the posture teach pendant 30 and the host computer 34 are connected in communication; the posture teaching unit 45 receives the posture data of the posture teach pendant 30 in real time when the host computer 20 sequentially reads the 3D coordinates of the path points in the basic coordinate system of the virtual robot model, so that the virtual robot model 43 move based on the 3D coordinates of the path point, as shown in FIG. 5. During the movement, the received posture data records the posture data corresponding to the 3D coordinates of the path point where the current motion is located. Based on the position and posture of the path point, the inverse kinematics model of the physical robot is used to calculate rotation angles of joints of the virtual robot model 43, so that the joints of the virtual robot model 43 are driven to move, and the movement position and posture of the physical robot 50 in a working process are simulated. At the same time, the virtual-real collision detection module detects whether the virtual robot model 43 interferes with the physical working environment. If the teaching posture is reasonable and no interference occurs, the host computer 20 stores the teaching information of the point, otherwise the teaching programmer 70 changes the teaching postures and positions until the interference disappears. More preferably, the teaching programmer 70 sets the movement speed, the working mode and the process parameters of the robot end effector through the input switch button unit 33 of the posture teach pendant 30. For example, in welding programming, welding process parameters include: welding voltage, welding current, welding gun switch signal, wire feeding speed, protective gas switch signal, etc. The working mode refers to different distance between the robot end effector and the workpiece to be operated while setting the industrial robot to perform different operations (such as welding, grinding, painting, etc.), for example, the robot end effector needs to contact the surface of the workpiece when welding, while there must be a certain distance from the surface of the workpiece when spraying. The input switch button unit 33 transmits parameter information set by the button (the parameter information includes the movement speed, process parameters of the robot end effector, working mode, etc.) to the signal processing unit 31; after the parameter information and the posture data is processed by the signal processing unit 31, the wireless communication unit 34 sends the signal being processed to the host computer 20; after receiving the above information, the host computer 20 drives the virtual robot model 43. In the above teaching process, the teaching programmer 70 can also define the movement speed and other parameters of the end effector of the virtual robot model 43 by operating the input switch button unit 33 of the posture teach pendant 30, and then transfer the process parameters to the host computer 20. The host computer 20 records in real time position, posture and corresponding parameters.

S60: Processing and AR simulating after teaching: after the robot teaching is completed, the host computer 20 edits and processes the recorded teaching path trajectory, the teaching postures, movement speed, and process parameters, for example the path points are processed smoothly to form the final path, and then the host computer 20 uses the inverse kinematics model of the physical robot to calculate the rotation angles of joints of the physical robot 50 based on the edited data, thereby driving the virtual robot model 43 to move and simulating the work of the physical robot 50 in the environment of AR registration process.

S70: Controlling the physical robot 50: the physical robot 50 is connected to the physical robot controller 60, and the physical robot controller 60 is connected to the host computer 20. The host computer 20 performs robot programming based on the path trajectory, posture and process parameters verified by the simulation editing, and transfers the program to the physical robot controller 60 to control the physical robot 50 to work in real, thereby realizing the teaching programming function while the physical robot 50 does not work during the interactive teaching process.

The invention provides a system for robot teaching based on RGB-D images and a teach pendant, in which the teaching programmer 70 completes the path trajectory teaching in the path planning unit 44 in the host computer 20, completes the posture teaching in the posture teaching unit 45, and further sets the robot movement speed and process parameters, where the host computer 20 processes teaching data and generate path trajectory, posture, movement speed, working mode, etc. The AR teaching system 40 realizes AR simulation and simulates the working process of the physical robot 50, so that the physical robot 50 is not required to participate in the teaching process. The virtual-real collision detection module detects the interference between the virtual robot and the working scene in time, and checks whether the robot posture meets the requirements. Then the host computer generates code based on the path trajectory and process parameters verified by simulation editing and the instruction format of the programming system of the physical robot, thereby realizing the teaching programming function.

EXAMPLE 2

Referring to FIGS. 1-4, illustrated is a method for robot teaching based on RGB-D images and a teaching pendant, including system initialization steps and interactive teaching programming steps.

The system initialization steps include step 1 to step 3:
System Initialization Steps:
S10: establishing a virtual robot model 43 in the host computer 20: as shown in FIG. 6, the 3D models of the physical robot and the robot end effector which are the same as the physical robot 50 are drawn to scale in the host computer 20; and a forward kinematics model and an inverse kinematics model are established based on structures and parameters of the physical robot and the robot end effector, thereby establishing a virtual robot model 43.

S20: Registering AR: the AR registration module in the AR teaching system 40 reads the position of the AR registration card 41 in the RGB images, and calculates the transformation matrix $M_A^R$ of the RGB camera relative to the AR registration card 41 through the AR registration algorithm; the host computer 20 use the transformation matrix $M_R^A$ to set the position of the virtual camera in the virtual world, and accurately place the virtual robot model 43 on the position of the AR registration card 41 in the RGB images, so as to achieve the integration of the virtual environment and the physical working environment, as shown in FIG. 8. In this embodiment, artookit can be used for AR registration, in which the transformation matrix from the AR registration card coordinate system to the camera coordinate system can be calculated; after the transformation matrix is converted into a homogeneous coordinate matrix, the transformation matrix $M_A^R$ of RGB camera relative to AR registration card 41 is obtained. The transformation matrix of the card 41 is used to set the position of the virtual camera for AR registration.

S30: Establishing coordinate systems and calibrating mapping relationships:

S310: a coordinate system of the AR registration card is set as a world coordinate system of the virtual scene and a physical scene, and the system of the AR registration card coordinate is set as the virtual robot model basic coordinate system; in order to obtain the transformation matrix of the physical robot from basic coordinate system to the world coordinate system (i.e., the basic coordinate system of the virtual robot model), the coordinates of the corresponding common point set in the basic coordinate system of the physical robot and the world coordinate system is obtained (the points in the common point set are the coordinates in the physical robot base coordinate system corresponding with the world coordinate system. For example, four points ABCD in the world coordinate system are selected and the corresponding coordinates in the world coordinate system are recorded, and then the end effector of the physical robot are placed on the four points, so that the coordinates of the four points in the basic coordinates of the physical robot are obtained); an iterative method based on an orthogonal matrix is used to solve the transformation matrix $M_r^w$ of the physical robot coordinate system to the world coordinate system, and the transformation matrix $M_r^w$ is used to transform the basic coordinate system of the physical robot to the world coordinate system, thereby realizing the coincidence of the basic coordinate system of the physical robot and the basic coordinate system of the virtual robot model.

S320: In the path planning unit: an RGB image pixel coordinate system, a depth image pixel coordinate system, an RGB camera coordinate system, and a depth camera coordinate system are established, and mapping relationships among the RGB image pixel coordinate system, the depth image pixel coordinate system, the RGB camera coordinate system, and the depth camera coordinate systems are establish. the selected waypoint is taken as an example to illustrate the process of establishing the mapping relationship: after the teaching programmer 70 selects the path point on the RGB image, the RGB image pixel coordinate (u, v) of each path point is calibrated; a transformation matrix H of the RGB image pixel coordinate system relative to the depth image pixel coordinate system is calculated through calibration calculation or factory parameters of the RGB-D camera 10; the depth image pixel coordinates ($u_d$, $v_d$) of each point corresponding to the RGB image pixel coordinate (u, v) is calculated, and the corresponding depth value z is read; an internal parameter matrix M of the depth camera is calibrated, and the position (x, y, z) of the path point (the coordinate is ($u_d$, $v_d$), the depth value is z) of the depth image pixel coordinate system in the depth camera coordinate system is calculated through the parameter matrix M; the external parameter matrices of the RGB camera and the depth camera are calibrated, and a transformation matrix $M_D^R$ of the depth camera and the RGB camera can be obtained through the two external parameter matrices; the AR registration card 41 in RGB images is recognized through an AR registration algorithm, thereby calculating the RGB camera posture matrix $M_R^A$ in the AR registration card coordinate system; the RGB image pixel coordinate (u, v) is converted into the depth image pixel coordinate ($u_d$, $v_d$) through an equation $$\begin{bmatrix} u_d \\ v_d \\ 1 \end{bmatrix} = H * \begin{bmatrix} u \\ v \\ 1 \end{bmatrix};$$

after the corresponding depth value z is read, the virtual robot model is sequentially transformed through the depth camera coordinate system, the RGB camera coordinate system, and the virtual robot model base coordinate system, so that a 3D coordinate (X, Y, Z) of the path point in the basic coordinate system of the virtual robot model is obtain; the transformation is:

$$\begin{bmatrix} x \\ y \\ z \\ 1 \end{bmatrix} = M^{-1} * z \begin{bmatrix} u_d \\ v_d \\ 1 \end{bmatrix}, \begin{bmatrix} X \\ Y \\ Z \\ 1 \end{bmatrix} = M_R^A * M_D^R * \begin{bmatrix} x \\ y \\ z \\ 1 \end{bmatrix}.$$

S330: In the posture teaching unit 45: a homogeneous transformation matrix $M_V^N$ between the basic coordinate system of the virtual robot model and the Cartesian coordinate system is obtained through calibrating or setting; where the basic coordinate system of the posture teach pendant is the Cartesian coordinate system; $Q_V = M_V^N * Q$, where Q is the homogeneous coordinate matrix of the posture teach pendant is set in the Cartesian coordinate system as, and $Q_V$ is the homogeneous coordinate matrix of the posture teach pendant in the basic coordinate system of the virtual robot model, then; thereby, the posture data of the posture teach pendant 30 in the Cartesian coordinate system are converted to the basic coordinate system of the virtual robot model.

The interactive teaching programming steps are as follows.

S40: Teaching path trajectory: the path planning unit 44 in the host computer 20 displays the RGB images and depth images of the physical working environment collected by the RGB-D camera 10 in real time; the teaching programmer 70 uses a mouse or other interactive device to select a series of working path points on the path of the planning robot end effector, and the path point is coordinate transformed to obtain the 3D coordinates (X, Y, Z) of the robot end effector in the base coordinate system of the virtual robot model.

S50: Teaching posture and process parameters: the posture teach pendant 30 and the host computer 34 are connected in communication; the posture teaching unit 45 receives the posture data of the posture teach pendant 30 in real time when the host computer 20 sequentially reads the 3D coordinates of the path points in the basic coordinate system of the virtual robot model, so that the virtual robot model 43 move based on the 3D coordinates of the path point, as shown in FIG. 5. During the movement, the received posture data records the posture data corresponding to the 3D coordinates of the path point where the current motion is located. Based on the position and posture of the path point, the inverse kinematics model of the physical robot is used to calculate rotation angles of joints of the virtual robot model 43, so that the joints of the virtual robot model 43 are driven to move, and the movement position and posture of the physical robot 50 in a working process are simulated. At the same time, the virtual-real collision detection module detects whether the virtual robot model 43 interferes with the physical working environment. If the teaching posture is reasonable and no interference occurs, the host computer 20 stores the teaching information of the point, otherwise the teaching programmer 70 changes the teaching postures and positions until the interference disappears. More preferably, the teaching programmer 70 sets the movement speed, the working mode and the process parameters of the robot end effector through the input switch button unit 33 of the posture teach pendant 30. For example, in welding programming, welding process parameters include: welding voltage, welding current, welding gun switch signal, wire feeding speed, protective gas switch signal, etc. The working mode refers to different distance between the robot end effector and the workpiece to be operated while setting the industrial robot to perform different operations (such as welding, grinding, painting, etc.). for example, the robot end effector needs to contact the surface of the workpiece when welding, while there must be a certain distance from the surface of the workpiece when spraying. The input switch button unit 33 transmits parameter information set by the button (the parameter information includes the movement speed, process parameters of the robot end effector, working mode, etc.) to the signal processing unit 31; after the parameter information and the posture data is processed by the signal processing unit 31, the wireless communication unit 34 sends the signal being processed to the host computer 20; after receiving the above information, the host computer 20 drives the virtual robot model 43. In the above teaching process, the teaching programmer 70 can also define the movement speed and other parameters of the end effector of the virtual robot model 43 by operating the input switch button unit 33 of the posture teach pendant 30, and then transfer the process parameters to the host computer 20. The host computer 20 records in real time position, posture and corresponding parameters.

S60: Processing and AR simulating after teaching: after the robot teaching is completed, the host computer 20 edits and processes the recorded teaching path trajectory, the teaching postures, movement speed, and process parameters, for example the path points are processed smoothly to form the final path, and then the host computer 20 uses the inverse kinematics model of the physical robot to calculate the rotation angles of joints of the physical robot 50 based on the edited data, thereby driving the virtual robot model 43 to move and simulating the work of the physical robot 50 in the environment of AR registration process.

S70: Controlling the physical robot 50: the physical robot 50 is connected to the physical robot controller 60, and the physical robot controller 60 is connected to the host computer 20. The host computer 20 performs robot programming based on the path trajectory, posture and process parameters verified by the simulation editing, and transfers the program to the physical robot controller 60 to control the physical robot 50 to work in real, thereby realizing the teaching programming function while the physical robot 50 does not work during the interactive teaching process.

The invention provides a method for robot teaching based on RGB-D images and a teach pendant, in which the teaching programmer 70 completes the path trajectory teaching in the path planning unit 44 in the host computer 20, completes the posture teaching in the posture teaching unit 45, and further sets the robot movement speed and process parameters, where the host computer 20 processes teaching data and generate path trajectory, posture, movement speed, working mode, etc. The AR teaching system 40 realizes AR simulation and simulates the working process of the physical robot 50, so that the physical robot 50 is not required to participate in the teaching process. The virtual-real collision detection module detects the interference between the virtual robot and the working scene in time, and checks whether the robot posture meets the requirements. Then the host computer generates code based on the path trajectory and process parameters verified by simulation editing and the instruction format of the physical robot programming system, thereby realizing the teaching programming function.

The above embodiments are only illustrative of the invention, and are not intended to limit the scope of the invention. Any equivalent modification for structures or processes based on description and drawings of the present invention, or direct or indirect applications in other related field shall fall within the scope of the appended claims.

What is claimed is:

1. A system for robot teaching based on RGB-D images and a teach pendant, comprising:
    a RGB-D camera,
    a host computer,
    a posture teach pendant, and
    an AR teaching system;
    wherein, the RGB-D camera and the posture teach pendant are communicated with the host computer; the RGB-D camera is set in a physical working environment, and the AR teaching system comprises an AR registration card located in the physical working environment, an AR module running in the host computer, a virtual robot model comprising a robot end effector, a path planning unit and a posture teaching unit;
    RGB images and depth images of the physical working environment are collected by the RGB-D camera in real time and are sent to the host computer; the AR module sets a position of a virtual camera in a virtual scene, and overlays the virtual robot model on the RGB images to complete AR registration; the path planning unit displays the RGB images and depth images, and a teaching programmer interactively selects path points of the robot end effector on the RGB images, thereby calculating a 3D coordinate of each of the path points of the robot end effector in a basic coordinate system of the virtual robot model based on a transformation between the depth images and the RGB images; the posture teach pendant is operated by the teaching programmer to generate posture data; the posture teaching unit receives the posture data of the posture teach pendant in real time when the host computer sequentially reads the 3D coordinates of the path points of the robot end effector in the basic coordinate system of the virtual robot model, and then the virtual robot model moves based on the 3D coordinates; during the movement, the received posture data is recorded as the posture data corresponding to a 3D coordinate of a path point where the virtual robot model is located, so that the virtual robot model moves in accordance with teaching postures and positions to complete the robot teaching.

2. The system of claim 1, wherein, the AR teaching system further comprises a virtual-real collision detection module running in the host computer; when the virtual robot model moves in accordance with the teaching postures and positions, the virtual-real collision detection module detects whether the virtual robot model interferes with the physical working environment; if yes, a prompt is issued, so that the teaching programmer controls the posture teach pendant to adjust the teaching postures and positions in time until the interference disappears;
    after the robot teaching is completed, the path points are edited to form a path trajectory; based on the edited path trajectory, the host computer generates a program code based on an instruction format of a programming system of a physical robot, and transmits the program code to a controller of the physical robot, so as to control the physical robot to work in the physical working environment.

3. The system of claim 1, wherein, the posture teach pendant comprises a signal processing unit, an inertial measurement unit connected to the signal processing unit, an input switch button unit, a wireless communication unit, and an interface display unit; an inertial sensor built in the inertial measurement unit is used to measure the posture data of the posture teach pendant in a Cartesian coordinate system; the teaching programmer sets parameter information of the robot end effector through the input switch button unit, and the input switch button unit transmits the parameter information set by a button to the signal processing unit; the parameter information and posture data are processed by the signal processing unit and sent by the wireless communication unit to the host computer, and the host computer drives the virtual robot model after receiving the processed parameter information and posture data; and the interface display unit displays working states and working data of the posture teach pendant in real time.

4. The system of claim 3, wherein, the posture teaching unit receives the posture data and parameter information of the posture teach pendant in real time when the host computer sequentially reads the 3D coordinates of the path points in the basic coordinate system of the virtual robot model, and then the virtual robot model moves based on the 3D coordinates; during the movement, the received posture data and the parameter information are recorded as the posture data and the parameter information corresponding to 3D coordinates of the path point where the virtual robot model is located, so that the virtual robot model moves in accordance with the teaching postures and positions to complete the robot teaching.

5. The system of claim 1, wherein, the virtual robot model is established in the host computer; specifically, in the host computer, 3D models of the physical robot and the robot end effector which are the same as the physical robot are drawn to scale; and a forward kinematics model and an inverse kinematics model are established based on structures and parameters of the physical robot and the robot end effector, thereby establishing the virtual robot model.

6. The system of claim 5, wherein, after creating the virtual robot model and completing the AR registration, the host computer further performs the following steps:
    (1) establishing coordinate systems and calibrating mapping relationships;
    (i) setting a coordinate system of the AR registration card as a world coordinate system of the virtual scene and a physical scene, and setting the coordinate system of the AR registration card as the basic coordinate system of the virtual robot model; making a basic coordinate system of the physical robot coincide with the basic coordinate system of the virtual robot model;
    (ii) in the path planning unit: establishing an RGB image pixel coordinate system, a depth image pixel coordinate system, an RGB camera coordinate system, and a depth camera coordinate system, and establishing mapping relationships among the RGB image pixel coordinate system, the depth image pixel coordinate system, the RGB camera coordinate system, and the depth camera coordinate systems; and (iii) in the posture teaching unit: obtaining a homogeneous transformation matrix $M_V^N$ between the basic coordinate system of the virtual robot model and the Cartesian coordinate system through calibrating or setting; where the basic coordinate system of the posture teach pendant is the Cartesian coordinate system; $Q_V=M_V^N*Q$, where Q is the homogeneous coordinate matrix of the posture teach pendant in the Cartesian coordinate system, and $Q_V$ is the homogeneous coordinate matrix of the posture teach pendant in the basic coordinate system of the virtual robot model, converting the posture data of the posture teach pendant in the Cartesian coordinate system to the basic coordinate system of the virtual robot model.

7. The system of claim 1, wherein, the step of calculating the 3D coordinate of each of the path points of the robot end effector in the basic coordinate system of the virtual robot model based on the transformation between the depth images and the RGB images comprises:

after the teaching programmer selects the path points on the RGB images, calibrating a RGB image pixel coordinate (u, v) of each of the path points; calculating a transformation matrix H of the RGB image pixel coordinate system relative to the depth image pixel coordinate system through the calibration or factory parameters of the RGB-D camera, and calculating a depth image pixel coordinate $(u, v_d)$ of each of the path points corresponding to the RGB image pixel coordinate (u,v) based on the transformation matrix H, and reading out a corresponding depth value z; calibrating an internal parameter matrix M of the depth camera, and calculating a position (x, y, z) of each of the path points of the depth image pixel coordinate system in the depth camera coordinate system through the internal parameter matrix M; calibrating a transformation matrix $M_D^R$ of the depth camera coordinate system to the RGB camera coordinate system, and recognizing the AR registration card in the RGB images through an AR registration algorithm, thereby calculating an RGB camera posture matrix $M_R^A$ in the coordinate system of the AR registration card; converting the RGB image pixel coordinate (u, v) into the depth image pixel coordinate $(u_d, v_d)$ through an equation $$\begin{bmatrix} u_d \\ v_d \\ 1 \end{bmatrix} = H * \begin{bmatrix} u \\ v \\ 1 \end{bmatrix},$$

and after reading out the corresponding depth value z, sequentially transforming the virtual robot model through the depth camera coordinate system, the RGB camera coordinate system, and the base coordinate system of the virtual robot model, so as to obtain a 3D coordinate (X, Y, Z) of each of the path points in the basic coordinate system of the virtual robot model; wherein the transformation is:

$$\begin{bmatrix} x \\ y \\ z \\ 1 \end{bmatrix} = M^{-1} * z \begin{bmatrix} u_d \\ v_d \\ 1 \end{bmatrix}, \begin{bmatrix} X \\ Y \\ Z \\ 1 \end{bmatrix} = M_R^A * M_D^R * \begin{bmatrix} x \\ y \\ z \\ 1 \end{bmatrix}.$$

8. A method for robot teaching based on RGB-D images and a teach pendant using the system of claim 1, the method comprising:

(1) teaching path trajectory: collecting the RGB images and depth images of the physical working environment to the host computer in real time through the RGB-D camera located in the physical working environment, and displaying the RGB images and depth images in the host computer; reading out the path points of the robot end effector, and calculating the 3D coordinate of each of the path points of the robot end effector in the basic coordinate system of the virtual robot model based on the transformation between the depth images and the RGB images by the teaching programmer; and (2) teaching postures: connecting the posture teach pendant with the host computer in communication; operating the posture teach pendant by the teaching programmer to generate posture data, and sending the posture data to the host computer in real time; receiving, by the posture teaching unit, posture data of the posture teach pendant in real time when the host computer sequentially reads 3D coordinates of the path points in the basic coordinate system of the virtual robot model, so that the virtual robot model moves based on the 3D coordinates; during the movement, recording the received posture data as the posture data corresponding to the 3D coordinate of the path point where the virtual robot model is located; calculating rotation angles of joints of the virtual robot model using the inverse kinematics model of the physical robot based on positions and postures of the path points; driving movements of the joints of the virtual robot model in the AR environment, and simulating the positions and postures of the physical robot during operating, so as to complete the robot teaching.

9. The method of claim 8, wherein, in the step 2, when the virtual robot model moves based on the teaching postures, a virtual-real collision detection module is used to detect whether the virtual robot model interferes with the physical working environment; if yes, a prompt is issued, so that the teaching programmer controls the posture teach pendant to adjust the teaching posture in time until the interference disappears; and wherein the method further comprises:
processing and AR simulating after teaching: after the robot teaching is completed, editing, by the host computer, the recorded teaching path trajectory and teaching postures, and calculating the rotation angles of the joints of the physical robot using the inverse kinematics model of the physical robot based on the edited data by the host computer, thereby driving the virtual robot model to move and simulating the working process of the physical robot in the AR registration environment.

10. The method of claim 8, wherein, in the step 1, the step of calculating the 3D coordinate of each of the path points of the robot end effector in the basic coordinate system of the virtual robot model based on the transformation between the depth images and the RGB images comprises:

after the teaching programmer selects the path points on the RGB images, calibrating the RGB image pixel coordinate (u, v) of each of the path points; calculating a transformation matrix H of the RGB image pixel coordinate system relative to the depth image pixel coordinate system through calibration or factory parameters of the RGB-D camera, and calculating the depth image pixel coordinate ($u_d$, $v_d$) of each of the path points corresponding to the RGB image pixel coordinate (u, v), and reading out the corresponding depth value z; calibrating an internal parameter matrix M of the depth camera, and calculating the position (x, y, z) of the path point of the depth image pixel coordinate system in the depth camera coordinate system through the internal parameter matrix M; calibrating a transformation matrix $M_D^R$ of the depth camera coordinate system to the RGB camera coordinate system, and recognizing the AR registration card in the RGB images through an AR registration algorithm, thereby calculating an RGB camera posture matrix $M_R^A$ in the coordinate system of the AR registration card; converting the RGB image pixel coordinate (u, v) into the depth image pixel coordinate ($u_d$, $v_d$) through an equation $$\begin{bmatrix} u_d \\ v_d \\ 1 \end{bmatrix} = H * \begin{bmatrix} u \\ v \\ 1 \end{bmatrix},$$

and after reading out the corresponding depth value z, sequentially transforming the virtual robot model through the depth camera coordinate system, the RGB camera coordinate system, and the base coordinate system of the virtual robot model, so as to obtain a 3D coordinate (X, Y, Z) of each of the path points in the basic coordinate system of the virtual robot model; wherein the transformation is:

$$\begin{bmatrix} x \\ y \\ z \\ 1 \end{bmatrix} = M^{-1} * z \begin{bmatrix} u_d \\ v_d \\ 1 \end{bmatrix}, \begin{bmatrix} X \\ Y \\ Z \\ 1 \end{bmatrix} = M_R^A * M_D^R * \begin{bmatrix} x \\ y \\ z \\ 1 \end{bmatrix}.$$

* * * * *